United States Patent
Zuo et al.

(10) Patent No.: US 9,004,648 B2
(45) Date of Patent: Apr. 14, 2015

(54) INKJET PRINTHEADS CONTAINING EPOXY ADHESIVES AND METHODS FOR FABRICATION THEREOF

(71) Applicant: Xerox Corporation, Norwalk, CT (US)

(72) Inventors: Yanjia Zuo, Rochester, NY (US); John R. Andrews, Wilsonville, OR (US); Pratima Gattu Naga Rao, Sherwood, OR (US); Mandakini Kanungo, Penfield, NY (US); Hong Zhao, Webster, NY (US); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 104 days.

(21) Appl. No.: 13/957,084

(22) Filed: Aug. 1, 2013

(65) Prior Publication Data

US 2015/0035903 A1   Feb. 5, 2015

(51) Int. Cl.
*B41J 2/17* (2006.01)
*B41J 2/14* (2006.01)
*B32B 37/00* (2006.01)

(52) U.S. Cl.
CPC . *B41J 2/14* (2013.01); *B32B 37/00* (2013.01); *B32B 2250/03* (2013.01); *B32B 2363/00* (2013.01); *B32B 2333/08* (2013.01)

(58) Field of Classification Search
None
See application file for complete search history.

(56) References Cited

U.S. PATENT DOCUMENTS

| | | | | |
|---|---|---|---|---|
| 6,290,331 B1 * | 9/2001 | Agarwal et al. | | 347/47 |
| 7,264,329 B2 * | 9/2007 | Kato et al. | | 347/20 |
| 8,794,743 B2 * | 8/2014 | Zuo et al. | | 347/47 |

* cited by examiner

*Primary Examiner* — Lamson Nguyen
(74) *Attorney, Agent, or Firm* — MH2 Technology Law Group LLP

(57) ABSTRACT

Inkjet printheads containing a first plate, a second plate, and a cured adhesive composition disposed between and bonding the first plate and the second plate. The cured adhesive composition has a glass transition temperature of greater than about 115° C. and is stable when exposed to acrylate monomer. Also, inkjet printheads having a first plate, a second plate, and a cured thin film adhesive disposed between and bonding to both of the first plate and the second plate. The cured thin film adhesive contains a polyimide film disposed between a cured first adhesive layer and a cured second adhesive layer. Methods of preparing such inkjet printheads.

20 Claims, 7 Drawing Sheets

INKJET PRINTHEADS CONTAINING EPOXY ADHESIVES AND METHODS FOR FABRICATION THEREOF

BACKGROUND

Certain embodiments herein relate to printheads for use in inkjet printing, wherein the printheads are assembled with an adhesive compatible with ultraviolet curable inks. Also, described herein are methods of making such printheads.

Inkjet printing systems typically include one or more printheads having a plurality of inkjets from which drops of fluid (e.g., liquid or gel) ink are ejected toward a recording medium. The inkjets of a printhead receive ink from an ink supply chamber (manifold) in the printhead which, in turn, receives ink from a source such as an ink reservoir or an ink cartridge. Each inkjet includes a channel having one end in fluid communication with the ink supply chamber. The other end of the ink channel has an orifice or nozzle for ejecting/jetting drops of ink. An aperture plate of a printhead can have openings corresponding to the nozzles of the inkjets. An actuator is located along an ink channel near a nozzle to expel drops of fluid from the inkjet nozzles onto a recording medium. By selectively activating the actuators to eject ink drops as the recording medium and printhead assembly are moved relative to one another, the deposited drops can be precisely patterned to form particular text and/or graphic images on a recording medium.

Ultraviolet curable inks (e.g., fluid and phase change UV inks) permit increased printing speeds in inkjet printers, because they can be dried/set quickly in a controlled manner. UV inks can also be very durable. Formulations for UV inks (including UV curable phase change inks) are known in the art and can be manufactured using photoinitiators and mixtures of curable monomers and oligomers. Different types of UV inks can be used in different types of inkjet printers (e.g., piezoelectric inkjet printers, thermal inkjet printers, and acoustic inkjet printers).

Printheads used in the different types of inkjet printers can have a series/stack of plates, each plate performing an ascribed function within the printhead. A printhead assembly can, for example, include a piezoelectric transducer plate carrying PZT (lead zirconate titanate) slabs (or other actuator component plates), a stand-off plate, a circuit board, a manifold plate and a plate making up a compliant outer wall, among others. The stack for the printhead assembly can also include one or more adhesive layers that bond adjacent plates in the stacked assembly together. With direct marking print technologies, such as inkjet applications, the quality of print image resolution is very important. The quality of the printed image can be diminished when the structure of the ink channel or the stack of plates is deformed in the printhead.

The plates in a printhead stack can be formed of aluminum, stainless steel, gold-plated stainless steel, or plastics (such as, polyimides). In some assemblies, metallic plates are brazed together. However, some printheads have polymer adhesives that join metal and/or plastic plates of the stack. Some adhesives can result in squeeze-out, where the adhesive layer squeezes out from between two plates in the stack as the surfaces are bonded together. Incompatibility of an adhesive layer with ink (i.e., UV ink) being used or squeeze-out can deform the ink channel and lessen print quality. Further, the interaction between the ink (such as UV ink) and certain adhesive layers can weaken bonding between plates in the stack, which can cause structural failure of the printhead and reduce the printhead's operating life.

Achieving reliable adhesion between many different inkjet printhead layers and materials, particularly in the harsh environmental conditions found in current inkjet printhead uses, is a concern for device manufacturers. There is a need for adhesives to fix plates within a printhead stack together that are stable upon exposure to UV inks.

SUMMARY

Certain embodiments are drawn to inkjet printheads having a first plate, a second plate, and a cured adhesive composition disposed between and bonding the first plate and/or the second plate. The cured adhesive composition can have a glass transition temperature ($T_g$) of greater than about 115° C., and the cured adhesive composition can be stable when it is exposed to acrylate monomer. The cured adhesive composition can be prepared by curing an epoxy resin mixture comprising an epoxy novolac and an amine at a temperature of less than about 200° C.

Some embodiments are drawn to inkjet printheads having a first plate, a second plate, and a cured thin film adhesive disposed between and bonding to both of the first plate and the second plate. The cured thin film adhesive can contain a metal layer (such as, a stainless steel metal layer or aluminum layer, among others) or a polymer film (such as a polyimide film, among others) disposed between a cured first adhesive layer and a cured second adhesive layer. Curing of a first adhesive layer and a second adhesive layer at a temperature of less than about 200° C. while the first adhesive layer, metal layer or polymer film (i.e., polyimide layer), and second adhesive layer are disposed between the first plate and the second plate results in the bonding of the thin film adhesive to the plates. Both of the cured first adhesive layer and the cured second adhesive layer have a $T_g$ of greater than about 115° C. and are stable when exposed to acrylate monomer. The first adhesive layer and/or the second adhesive layer can contain an epoxy novolac and an amine.

Certain embodiments are drawn to methods of producing an inkjet printhead. Such methods include placing a thin film adhesive between a first plate and a second plate and curing the thin film adhesive at a temperature of less than about 200° C. as it is in contact with both a surface of the first plate and a surface of the second plate to bond the thin film adhesive to both plates. The cured thin film adhesive contains a metal layer or a polymer film (such as, a polyimide film) disposed between a cured first adhesive layer and a cured second adhesive layer. The cured first adhesive layer and the cured second adhesive layer have a $T_g$ of greater than about 115° C. and are stable when exposed to acrylate monomer. The first adhesive layer and/or the second adhesive layer contain an epoxy novolac and an amine.

Figure 1:
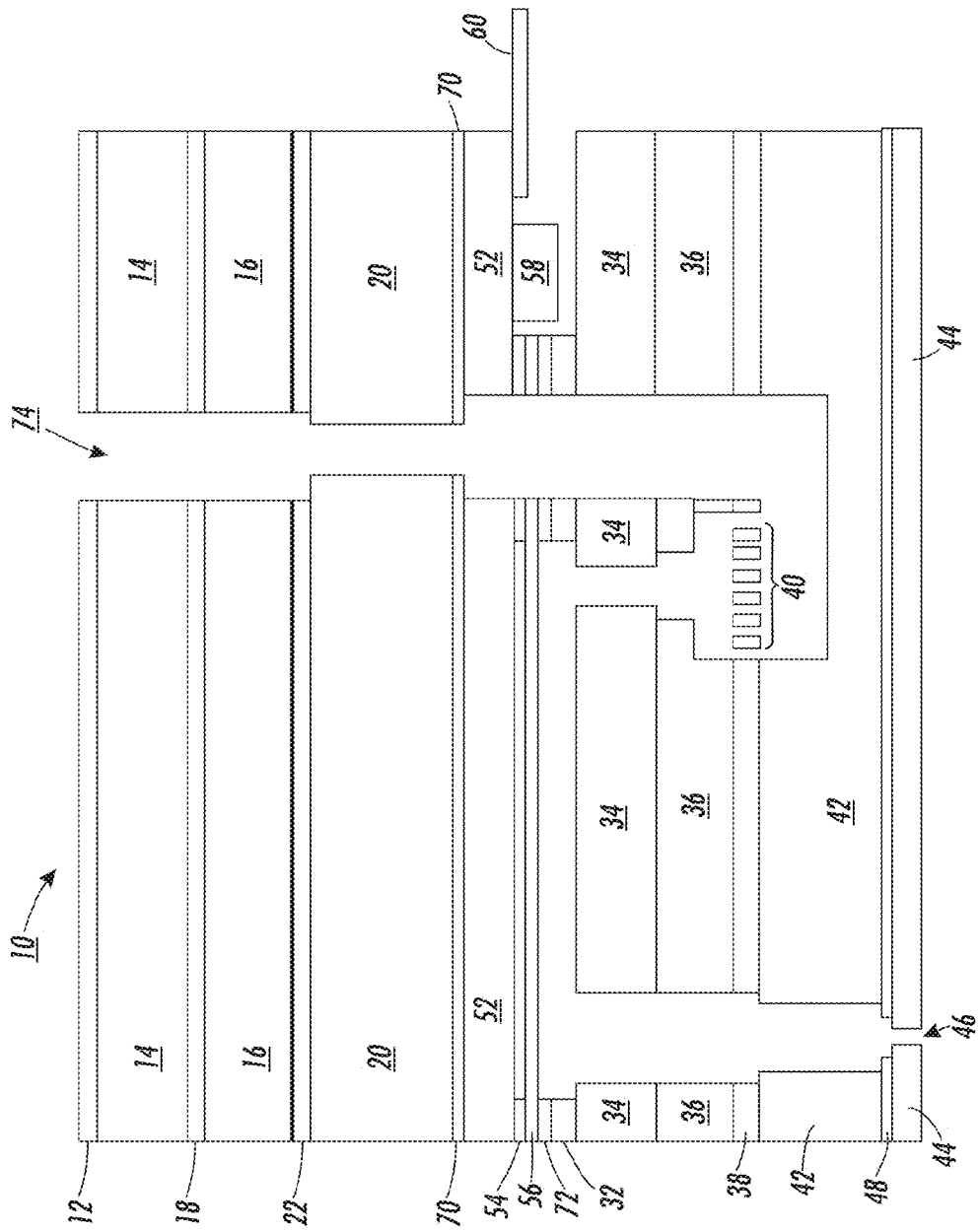
FIG. 1 is a cross section of an exemplary inkjet printhead formed in accordance with embodiments.

It should be noted that some details of the figures have been simplified and are drawn to facilitate understanding of the embodiments rather than to maintain strict structural accuracy, detail, and scale.

DETAILED DESCRIPTION

Certain embodiments are drawn to inkjet printheads comprising a first plate, a second plate, and a cured adhesive composition disposed between and bonding at least one of the first plate and the second plate. In some embodiments, the cured adhesive composition bonds to both of the first plate and the second plate to hold the plates together. In certain embodiments, the cured adhesive composition bonds to (a) the first plate or the second plate and (b) a metal layer or a polymer film (such as, a polyimide film), wherein the metal layer or polymer film is disposed between the first plate and the second plate. The cured adhesive composition can physically connect the first plate and the second plate.

Some embodiments are drawn to inkjet printheads comprising a first plate, a second plate, and a cured thin film adhesive disposed between and bonding to both of the first plate and the second plate. The cured thin film adhesive can comprise a metal layer or a polymer film (such as, a polyimide film) disposed between a cured first adhesive layer and a cured second adhesive layer. In some embodiments, curing of a first adhesive layer and a second adhesive layer at a temperature of less than about 200° C., less than about 220° C., or less than about 250° C. while the first adhesive layer, metal layer/polymer film (i.e., polyimide film), and second adhesive layer are disposed between the first plate and the second plate can result in the bonding of the cured thin film adhesive to the first plate and the second plate. The cured thin film adhesive can physically connect the first plate and the second plate. For example, the cross section can include the first plate, the cured first adhesive layer, the metal layer/polymer film, the cured second adhesive layer and the second plate, in series, such that the cured adhesive layer adheres to both the first plate and the metal layer/polymer film and the cured second adhesive layer adheres to both the second plate and the metal layer/polymer film.

In certain embodiments, the inkjet printhead can be a piezoelectric inkjet printhead, a thermal inkjet printhead, or an acoustic inkjet printhead. The inkjet printhead can be a piezoelectric printhead, in some embodiments. In embodiments, the inkjet printhead can be configured to contain and eject a UV ink or UV ink gel or can contain a UV ink or a UV ink gel.

In a "bubble jet" or thermal inkjet (TIJ) printer, each printhead can comprise a reservoir, a heating element, and a nozzle. When the heating element heats up, some of the ink is vaporized to create a bubble within the reservoir. As the bubble expands, an ink droplet is pushed out of the nozzle. When the bubble collapses, a vacuum is created which pulls ink into the reservoir from the ink cartridge. Some TIJ printers can use inks in a solvent (such as water) having a low viscosity of about 2 centipoises (cPs).

In a piezoelectric inkjet (PIJ) printer, each printhead can comprise a piezoelectric crystal at one end, a nozzle at the other end, and a reservoir between them. When an electric current is applied to the crystal, it vibrates. As the crystal vibrates inward (into the reservoir), an ink droplet is pushed out of the nozzle. When the crystal vibrates outward, a vacuum is created which pulls ink into the reservoir from the ink cartridge. The ink used in a PIJ printer can have a viscosity of about 10 to 12 cPs. Because a PIJ printer can operate at a higher viscosity range than thermal inkjet printers, a solvent-free UV-curable ink formulation (e.g., a phase change UV ink) can be used.

An acoustic beam exerts a radiation pressure against objects upon which it impinges. When an acoustic beam impinges on a free surface (i.e., a liquid/air interface) of a pool of liquid from beneath, the radiation pressure which it exerts against the surface of the pool may reach a sufficiently high level to release individual droplets of liquid from the pool, despite the restraining force of surface tension. In an acoustic ink printing (AIP) system, an acoustic beam is used in a printhead.

Commercially available inkjet printheads can be fabricated with multiple layers of materials. Known methods can employ, among other components, layers of gold plated stainless steel sheet metal with photochemically etched features which can be brazed together to form robust structures. With the drive to improve cost and performance of printheads alternate materials and bonding processes are being developed. Polymer layers can replace certain sheet metal components. However polymer layers require adhesives to bond to each other and/or to metal layers.

A schematic for an inkjet printhead is illustrated in FIG. 1, showing an inlet manifold (top) to an exit nozzle aperture plate (bottom). Ink can come in at one of four ports (e.g., one for each color of cyan, magenta, yellow, and black) and can be channeled to any of a plurality of nozzles (i.e., about 7040 exit nozzles), for which only one such path is illustrated in FIG. 1. To bond any combination of plates (e.g., stainless, aluminum or polyimide layers) can require a thin film adhesive.

Printhead structures are known in the art and include many layers laminated together and can be prepared by embodiments. In some embodiments, adhesives used for lamination can resist reaction with chemically harsh inks, bond well to surfaces of different materials to prevent rupture during high-pressure printing, and hold up during high temperature printing, for example during printing with solid inks.

FIG. 1 depicts a portion of one example of an inkjet printhead structure 10 that may be formed using an embodiment of the present teachings. The FIG. 1 printhead structure 10 includes a compliant wall 12, an external manifold 14, and a diverter 16 attached to the external manifold 14 with an external manifold adhesive 18. FIG. 1 further depicts a boss plate 20 attached to the diverter 16 with a diverter attach adhesive 22. In an embodiment, the compliant wall 12 can include thermoplastic polyimide, the external manifold 14 can include aluminum, and the boss plate 20 can include stainless steel. The external manifold 14 can receive liquid ink (not individually depicted for simplicity) during use which has been melted from solid ink blocks, a gel ink, a UV ink, or another liquid ink in preparation for printing, and maintain the ink at a print temperature.

FIG. 1 further depicts a body 32, a vertical inlet 34, a separator 36, a particulate filter (rock screen) layer 38 including a rock screen 40, a front end manifold 42, and an aperture plate 44 having a nozzle 46. The aperture plate 44 can be attached to the front end manifold 42 with an aperture plate adhesive 48. In an embodiment, the body 32, the separator 36, and the front end manifold 42 can include a metal such as stainless steel, and the vertical inlet 34, the rock screen layer 38, the aperture plate adhesive 48, and the aperture plate 44 can each include one or more polymers. The assembly 10 can be manufactured according to known processing techniques, such as a process including the use of a stack press under high pressure. FIG. 1 further depicts a substrate 52 such as a semiconductor wafer section, glass layer, metal layer, etc., a standoff layer 54, a printhead diaphragm (membrane) 56, a boss plate adhesive 70, a diaphragm adhesive 72, an application specific integrated circuit (ASIC) 58 attached to the semiconductor wafer section, and an interconnect layer 60 such as a flexible (flex) circuit or printed circuit board electrically coupled to the ASIC 58.

As discussed above, the substrate 52 can be a silicon, gallium arsenide, metal, glass, etc. Further, the standoff layer 54 can be silicon dioxide and/or SU-8 photoresist. The diaphragm 56 can be a metal such as titanium, nickel, or a metal alloy. The substrate 52 may include a circuit pattern. It will be appreciated that the depiction of the FIG. 1 is a small portion of a printhead depicting a single ink port 74 and nozzle 46, and that other structures may be added or existing structures may be removed or modified. A printhead with current designs may have four ink inlets, one for each color (cyan, magenta, yellow, and black in a CMYK color model, for example), and 7040 nozzles. The structure of FIG. 1 may be formed using an embodiment of the present teachings and may include a structure in accordance with an embodiment the present teachings.

In certain embodiments, the first plate can comprise aluminum, polymer (i.e., polyimide), stainless steel, or gold plated stainless steel and the second plate can comprise aluminum, polymer (i.e., polyimide), stainless steel, or gold plated stainless steel. The inkjet printhead can comprise at least one additional plate in addition to the first plate and the second plate. A plate can be in the form of a film.

Examples of plates (e.g., first plate and second plate) are shown in FIG. 1 and can be selected from a compliant wall 12, an external manifold 14, a diverter 16, a boss plate 20, a body 32, a vertical inlet 34, a separator 36, a rock screen layer 38, a front end manifold 42, an aperture plate 44, a substrate 52, a standoff layer 54, a membrane/diaphragm 56, an application specific integrated circuit (ASIC) 58, and a interconnect layer 60, among others known in the art.

In some embodiments, the cured adhesive composition can have a glass transition temperature ($T_g$) of greater than about 115° C., greater than about 170° C., or greater than about 200° C. The cured adhesive composition can be stable when exposed to acrylate monomer (such as acrylate monomers, including methacrylate monomers, found in some UV inks, among others). In embodiments, the cured adhesive composition can be thermoset. In an embodiment, the cured adhesive composition can resist chemical reaction (for example, weight gain, swelling, or oxidation) with ink (i.e., UV ink). In some embodiments, an ink within the inkjet printhead can physically contact the cured adhesive composition, and the ink can be an ultraviolet gel ink or a pigmented ink, and the cured adhesive composition can have a mass uptake (weight gain) of less than about 2% when exposed continuously to the ink for about 30 weeks; less than about 4% when exposed continuously to the ink for about 60 weeks; or less than about 6% when exposed continuously to the ink for about 120 weeks.

In certain embodiments, a cured thin film adhesive can comprise both a cured first adhesive layer and a cured second adhesive layer, each layer having a $T_g$ of greater than about 115° C., greater than about 170° C., or greater than about 200° C., wherein the adhesive layers are stable when exposed to acrylate monomer, including methacrylate monomer, among others. In some embodiments, lapshear strength of the cured thin film adhesive between two stainless steel surfaces, a stainless steel surface to a polyimide surface, or a polyimide surface to a polyimide surface is greater than about 200 psi, greater than about 500 psi, or greater than about 1000 psi at temperatures between about 25° C. and about 140° C., wherein the first and second adhesive layers have a thickness of between about 3 microns and about 9 microns. In embodiments the cured first adhesive layer and/or the cured second adhesive layer can be thermoset. In some embodiments, the cured first adhesive layer and/or the cured second adhesive layer can resist chemical reaction (for example, weight gain, swelling, or oxidation) with ink (i.e., UV ink).

To provide sufficient bonding of metal to metal, metal to polymer (such as polyimide), or polymer to polymer (i.e., polyimide to polyimide), an adhesive must provide a lapshear strength, regardless of the material, of greater than about 200 psi at about room temperature (20° C.) and at about 115° C., when cured at 190° C. for 70 minutes at 200 psi. Some known adhesives do not meet this tolerance, or meet the tolerance only at room temperatures. The cured thin film adhesive can have a lap bonding strength at a thickness of about 5.0 µm of about 1000 psi both at about room temperature (20° C.) and at about 115° C., when cured at a temperature of 190° C. for 70 minutes at 200 psi.

The cured adhesive composition and/or the cured first and second adhesive layers for printhead applications of embodiments can bond any combination of metal layers (e.g., stainless steel, aluminum, etc.) and/or polymer (i.e., polyimide layers). The cured adhesive composition and/or the cured first and second adhesive layers can be stable when exposed to UV inks and UV ink gels. The UV ink or UV ink gel may contain at least one acrylate monomer (such as a methacrylate monomer). The cured adhesive composition and/or the cured first and second adhesive layers can be have a thickness of about 1 microns to about 10 microns; about 2 microns to about 8 microns; or about 3 microns to about 5 microns. The cured adhesive composition and/or the cured first and second adhesive layers can be an electrical insulator.

The cured adhesive composition and/or the cured thin film adhesive for printhead applications of embodiments may be used, referring to FIG. 1, as one or more of the external manifold adhesive 18, the diverter attach adhesive 22, the aperture plate adhesive 48, the boss plate adhesive 70, the diaphragm adhesive 72, or generally any printhead adhesive. The cured adhesive composition and/or the cured thin film adhesive may be used to physically attach any combination of one or more metals (e.g., stainless steel, aluminum, copper, metal alloy, etc.), one or more semiconductors (e.g., silicon, gallium arsenide, etc.), and/or one or more organic or inorganic polymers (e.g., polyimide, nylon, silicone, etc.). Other known adhesive compositions may be used as one of the adhesives in an inkjet printhead stack in addition to the cured adhesive composition and/or the cured thin film adhesive.

An embodiment of the present teachings can result in a more robust physical adhesive connection between the various laminated layers within a printhead, particularly with regard to resistance to chemically harsh inks such as acrylate-based ultraviolet (UV) inks and pigmented inks, and may result in decreased stresses on the interconnection which electrically couples a piezoelectric transducer (PZT) to a circuit layer such as a printed circuit board or flexible printed circuit.

In certain embodiments, cured adhesive compositions and/or cured thin film adhesives can have an improved interface between plates of an inkjet printer, such that the adhesive interface is stable under higher loads. Cured adhesive compositions and/or cured thin film adhesives of embodiments can be compatible with LancE, Pigmented, UV gel (Xerox UV ink) and commercial UV inks (e.g., Sunjet UV ink). Further, cured adhesive compositions and/or cured thin film adhesives of embodiments can have minimal squeeze-out of adhesive to prevent blocking of nozzles in a fabricated inkjet printhead. In some embodiments, cured adhesive compositions and/or cured thin film adhesives of embodiments can minimize or reduce trapped air bubbles to prevent nonuniformity in jet geometry and occurrence of ink leakage. In some embodiments, the cured adhesive compositions and/or cured thin film adhesives of embodiments can have a good bonding strength greater than about 200 psi; greater than about 500 psi; or greater than about 1000 psi. The cured adhesive compositions and/or cured thin film adhesives of embodiments can have a storage modulus sufficient meet compliance and jetting requirements. In certain embodiments, the storage modulus can be about 100 MPa to about 2500 MPa at about 20° C.; or about 3 MPa to about 1500 MPa at about 120° C. The cured adhesive compositions and/or cured thin film adhesives of embodiments can have thermal oxidative stability.

Wicking or squeeze-out of an adhesive occurs when a cured adhesive has a change in dimension of about 5% or greater, which can lead to leakage of ink or bursting of the printhead during high-pressure printing. For example, pressures within a solid inkjet printhead can reach up to 10 psi. The cured adhesive compositions and/or cured thin film adhesives can have a squeeze-out of less than about 5%; less than about 10%; or less than about 20%.

Some cured adhesives known in the art can have a high surface roughness, for example greater than 0.5 µm peak-to-peak. Surface roughness may result in trapped air bubbles within the adhesive which expand and contract during a change in temperature and may fatigue the adhesive and result in ink leakage or bursting of the printhead during high-pressure printing. The cured adhesive compositions and/or cured thin film adhesives of embodiments can have a surface flatness (both sides) of less than about 0.5 µm peak-to-peak; less than about 2 µm peak-to-peak; or less than about 5 µm peak-to-peak.

Figure 2:
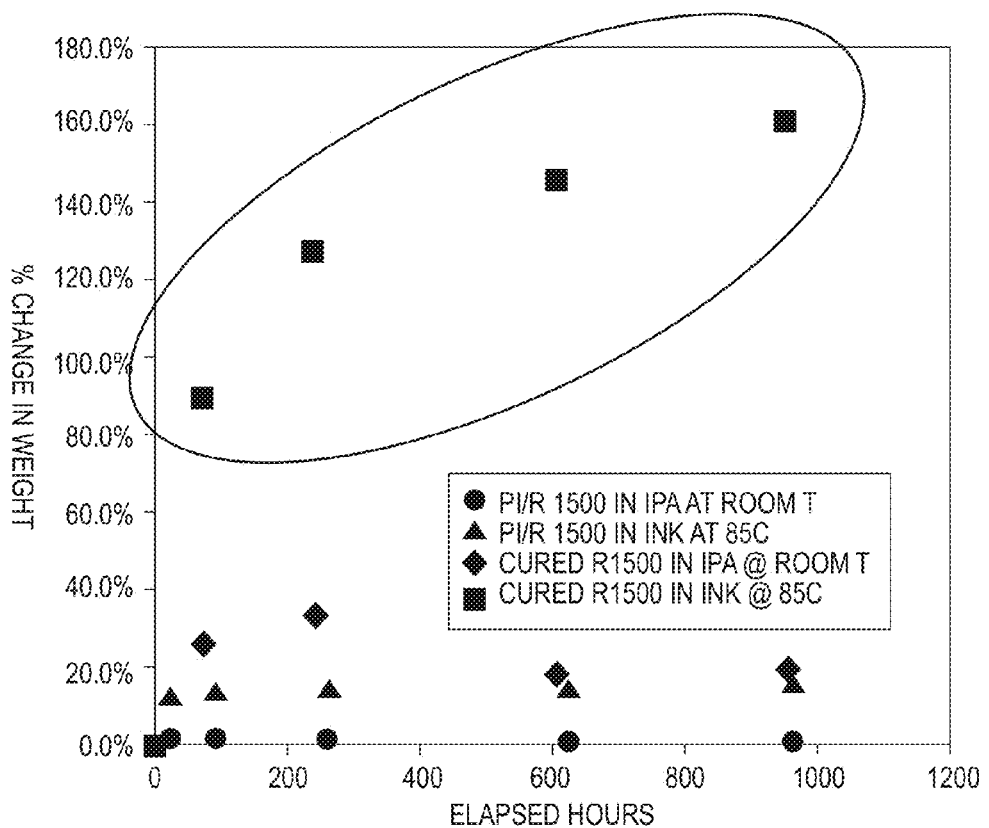
FIG. 2 is a graph of the percent weight change in cured R/flex® 1500 adhesive films soaked in isopropyl alcohol (IPA) or UV ink (Xerox UV gel ink) over time at room temperature (room T about 25° C.) and 85° C.

Commercially available R/flex® 1500 from Rogers Corporation can be used to bond different plates in known inkjet printheads. R/flex® 1500 adhesive is a thermoset acrylic polymer, when used at a thickness of 0.002 inches, can have the ability to take up surface flatness non-uniformities. It has been found that polymer films, such as the R/flex® 1500 film, may have a less than optimal interface between plates in an inkjet printer, such that the adhesive interface may shear under higher loads, and when the ink used in the printhead is a UV ink or UV ink gel the adhesive bond may weaken and, in some instances, fail. When printheads using the R/flex® 1500 baseline adhesive are used with the Xerox UV curable inks or UV inks from other commercial sources (e.g., from Sun Chemicals), the acrylate monomers in the inks can attack the acrylates in these adhesives over time. This can cause material swelling, which reduces both the inlet diameter and flow, as well as cause increased thickness at the material interfaces affecting jetting performance. FIG. 2 shows the ink compatibility test for R/flex® 1500 films used in inkjet printheads known in the art. The R/flex® 1500 film showed 160% weight gain in UV inks within 6 weeks. R/flex® 1500 has poor compatibility with acrylate based UV inks. UV gel inks can swell adhesive causing changes in dimensional geometry that can affect jetting performance of printheads.

Additionally, certain known liquid epoxy adhesives used for attaching PZT, lead zirconate titanate layers, in piezoelectric printheads can become stiffer which can result in jetstack opening within 35 days when aged at 170° C. in hot air. Printhead modularity design can be improved by using an adhesive having a relatively low bonding temperature (i.e., less than the bonding temperature of a commercial adhesive such as DuPont® ELJ-100 having a bonding temperature of 290° C.), and a glass transition temperature that is greater than the critical temperatures for the components of a jetstack (such as, a piezoelectric printhead). Cured adhesive compositions and/or cured thin film adhesives of embodiments can accommodate all the printhead components' bonding requirements.

In certain embodiments, the cured adhesive composition can be prepared by curing an epoxy resin mixture comprising an epoxy novolac and an amine at a temperature of less than about 200° C.; less than about 220° C.; or at a temperature between about 150° C. and about 200° C. (time 70 min and pressure 200 psi; thickness 3 micron). In some embodiments, there can be substantially no squeeze-out of the epoxy resin mixture as it is cured and/or as the cured epoxy resin mixture is exposed to inks (such as, UV inks). The epoxy resin mixture can be in liquid form in some embodiments.

The mass ratio of the epoxy novolac to the amine in the epoxy resin mixture can be about 100 to about 22.3; about 100 to about 25; or about 100 to about 30.

In some embodiments, the epoxy resin mixture can comprise a filler material. The particle size of the filler material can be as small as possible. Fillers can have a maximum particle size of less than 1.0 µm in diameter in certain embodiments. To minimize costs, an adhesive should have a long shelf life. The epoxy resin mixture and/or its components can have a shelf life of greater than about one month (30 days) at about 20° C., and/or at least about one year at about 0° C. In some embodiments, the epoxy resin mixture can further comprise an accelerator. The accelerator can be a tertiary amine, a carboxylic acid, or an alcohol (i.e., phenol or bisphenol A). In certain embodiments, the epoxy resin mixture can further comprise a curing agent. The curing agent can be methyl tetrahydrophthalic anhydride (MTHPA); dicyandiamide (Dicy); nadic methyl anhydride (NMA); diethyltoluene diamine (DETDA); diamino diphenyl sulfone (DDS); boron trifluoride monoethylamine ($BF_3$.MEA); or diaminocyclohexane (DACH).

Figure 7:
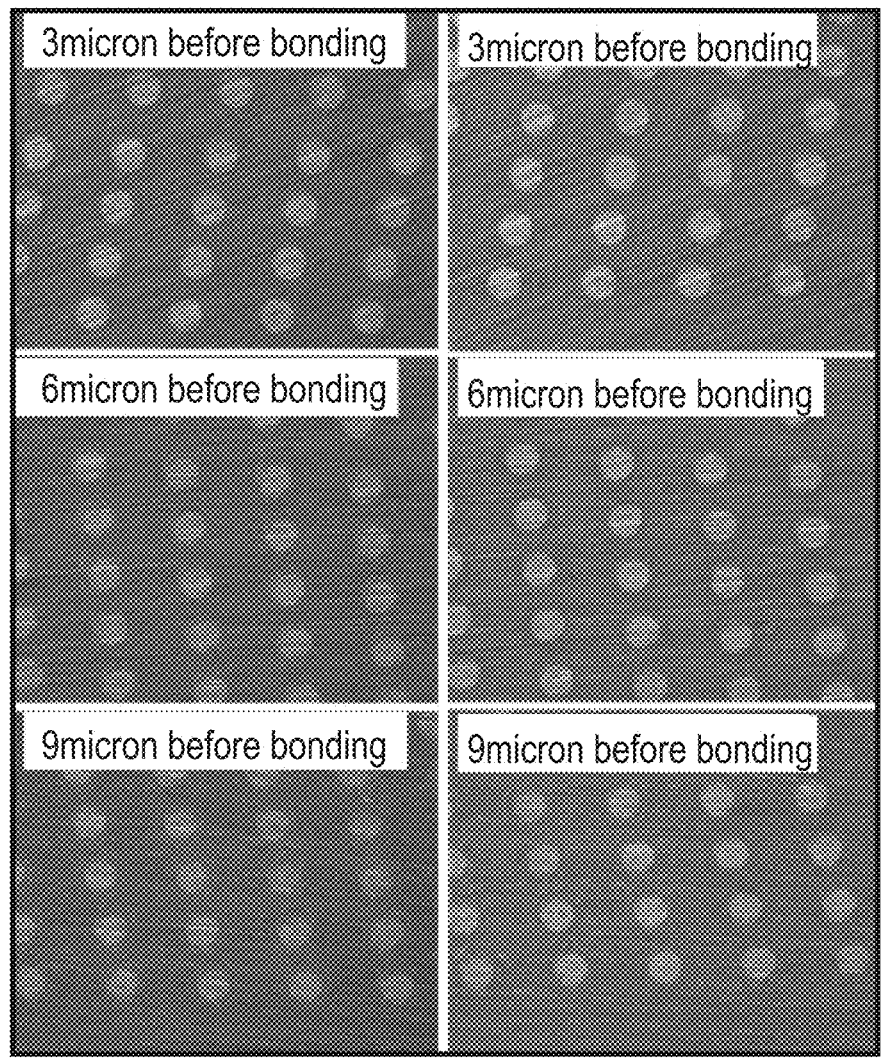
FIG. 7 shows the results of squeeze-out testing of polyimide films with adhesive coating of embodiments showing adhesive coating before and after bonding. Data for tests on adhesive coating thicknesses of 3, 6 and 9 microns are shown.
Figure 8:
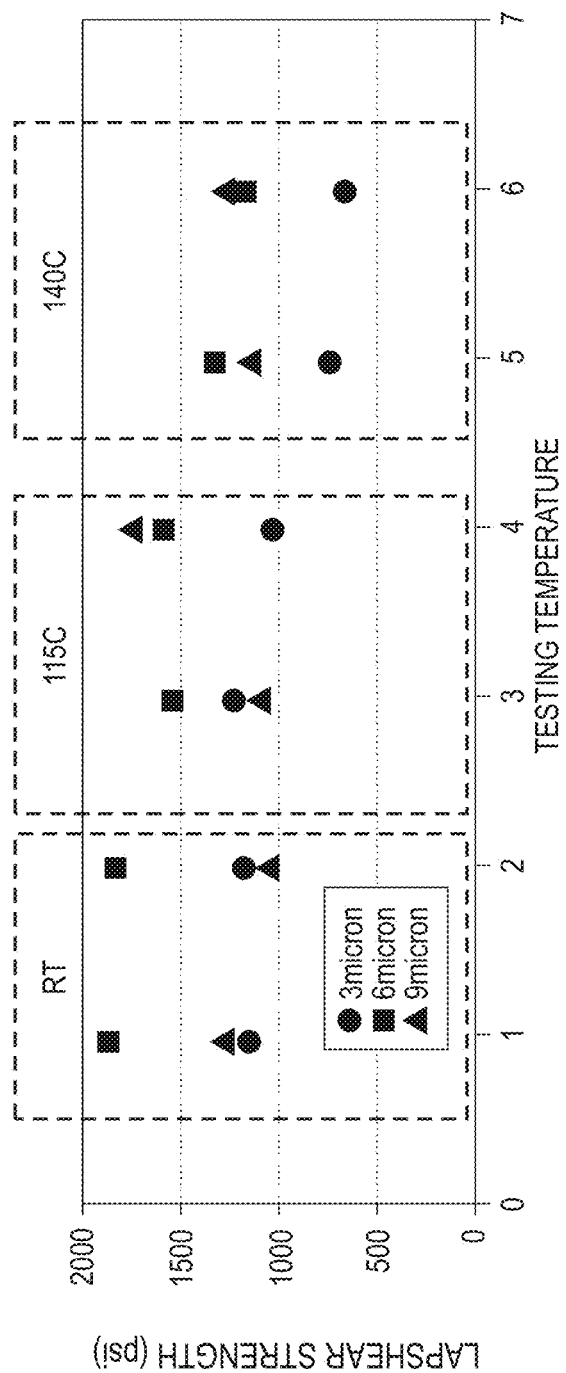
FIG. 8 is a graph of lapshear bonding strength of adhesive coated polyimide films of embodiments at room temperature (RT, 25° C.), 115° C. and 140° C. Data for tests on adhesive coating thicknesses of 3, 6 and 9 microns are shown.

Unlike film adhesives that can be cut into different features for interstitial bonding, liquid epoxy requires a special process to be able to dispense in a controlled manner onto a base material of interest (such as, a stainless or polyimide layer, among others). See FIG. 1 for different interstitial features in a piezoelectric printhead. Several dispensing techniques can be applied, such as draw bar coating, pad printing or screen printing to apply an epoxy resin mixture to a metal layer or polymer film (such as, a polyimide film). Herein, a novel fabrication process based on draw bar coating is described and enables the use of liquid epoxy adhesive for printhead interstitial bonding with minimal squeeze-out at high pressure and good bonding strength. From this process, epoxy coated polyimide film can be prepared (see FIG. 7).

The epoxy resin mixture can comprise a solvent to dilute it to a coatable form that may be coated onto a surface. In an embodiment, the solvent may be methylene chloride, acetone, methyl ethyl ketone (MEK), toluene, 1,2 dimethoxyethane, ethanol, methanol, or mixtures thereof. In an embodiment, the epoxy novolac and amine may be mixed with the solvent in a ratio of about 0.1 parts epoxy novolac and amine to 99.9 parts solvent, or about 1 parts epoxy novolac and amine to about 99 parts solvent, or between about 10 parts epoxy novolac and amine to 90 parts solvent.

The diluted epoxy novolac and amine/epoxy resin mixture can be coated with a draw bar to form a thin uniform film on the surface of a metal layer/film or a polymer film (e.g., a polyimide film). The surface material will depend on the application, and may include metals such as stainless steel or aluminum, or polymers other than polyimide. Draw bar coating can be used to form a dilute epoxy and amine/epoxy resin mixture on the surface having a thickness of between about 0.1 micrometer (µm) and about 100 µm, or between about 1.0 µm and about 50 µm, or between about 3.0 µm and about 10 µm. The thickness of the dilute epoxy and amine/epoxy resin mixture thickness may be controlled by the mixing ratio of the epoxy, amine and the solvent. Prior to applying the epoxy resin mixture, the surface can be treated by exposing the surface to an oxygen plasma. Without being bound to any specific theory, it is believed that the oxygen plasma treatment of a polyimide surface can create chemically active functional groups, such as carbonyl, hydroxyl, and carboxyl groups to improve interfacial adhesion. Oxygen plasma treatment may also be performed on a metal surfaces to improve the bondability with the epoxy resin mixture.

A cured thin film adhesive disposed between and bonding to both of a first plate and a second plate can comprise a metal layer or a polymer film (such as a polyimide film) disposed between a cured first adhesive layer and a cured second adhesive layer. The first adhesive layer and the second adhesive layer can be cured at a temperature of less than about 200° C., less than about 200° C. or less than about 250° C., while the first adhesive layer, metal layer or polymer film (i.e., polyimide film), and second adhesive layer are disposed between the first plate and the second plate to result in the bonding of the cured thin film adhesive to the first plate and the second plate. In some embodiments, there can be substantially no squeeze-out of the first adhesive layer and the second adhesive layer.

A prepared epoxy resin mixture coated polyimide film, metal layer, or polymer film other than polyimide can be laser cut into printhead interstitial features. The first and second adhesive layers can independently have a thickness of between about 1 microns to about 10 microns; about 2 microns to about 8 microns; or about 3 microns to about 5 microns before curing. The metal layer or polymer film (such as, polyimide film) disposed between the first and second adhesive layers can have a thickness of between about 1 microns to about 300 microns; about 10 microns to about 125 microns; or about 25 microns to about 50 microns. The cured thin film adhesive (including the cured first and second adhesive layers and the metal layer or polymer film) can have a thickness between about 3 microns to about 320 microns; about 14 microns to about 141 microns; or about 31 microns to about 60 microns.

The epoxy novolac can have an epoxide functionality (number of epoxide groups per molecule) greater than 2 to about 8; about 2.1 to about 5; about 2.3 to about 4; about 2.5 to about 3.5; or about 2.5. The epoxy novolac can have 180; 190; or 200 epoxide equivalents (g/eq). The amine can comprise at least two amino groups; between about two and four amino groups; or about two amino groups. The amine can be an aliphatic, a cycloaliphatic; or an aromatic amine. In some embodiments, the amine can be an aromatic amine.

In certain embodiments, the epoxy novolac can be an epoxy bisphenol A novolac and the amine can be isophorone diamine. EPON™ SU-2.5 (epoxide equivalent weight about 180 to about 200 g/eq; viscosity of about 20 P to about 60 P) can be used as the epoxy novolac in some embodiments. The amine can be EPIKURE 3300 (equivalent weight amount in grams required to react with one equivalent epoxide 42.6 g; amine value, milligrams KOH equivalent to basic nitrogen content of a one-gram sample, determined by acid-base titration of about 630 to about 670; parts by weight of curing agent by 100 parts of epoxy (EEW 190) of about 22.7). Both EPON™ SU-2.5 and EPIKURE 3300 are available from Momentive Specialty Chemicals Inc. In certain embodiments the concentration of epoxide groups is about equal to or lower than the concentration of NH groups in the epoxy resin mixture.

In embodiments, an epoxy resin mixture used to prepare the cured adhesive or the cured thin film adhesive has a storage modulus of about 100 MPa to about 1500 MPa; about 50 MPa to about 2500 MPa; or about 10 MPa to about 5000 MPa at about 20° C. and of about 3 MPa to about 700 MPa; about 1 MPa to about 1500 MPa; or about 0.5 MPa to about 3000 MPa at about 120° C.

Certain embodiments are drawn to methods of producing an inkjet printhead comprising placing a thin film adhesive between a first plate and a second plate; curing at a temperature of less than about 200° C. the thin film adhesive as it is in contact with both a surface of the first plate and a surface of the second plate, thereby bonding the cured thin film adhesive to both of the first plate and the second plate. The cured thin film adhesive can comprise a metal layer or a polymer film disposed between a cured first adhesive layer and a cured second adhesive layer. The cured thin film adhesive can comprise a polyimide film disposed between a cured first adhesive layer and a cured second adhesive layer. The cured first adhesive layer and the cured second adhesive layer can have a glass transition temperature ($T_g$) of greater than about 115° C. and can be stable when exposed to acrylate monomer. At least one of the first adhesive layer and the second adhesive layer can comprise an epoxy novolac and an amine.

The thin film adhesive can be prepared by applying an epoxy resin mixture to at least one surface of a metal layer or a polymer film (such as a polyimide film) and drying the epoxy resin mixture without curing the epoxy resin mixture. In certain embodiments, the epoxy resin mixture can also be applied to a second surface of a metal layer or a polymer film. In some embodiments, a thin film adhesive can be laser cut to conform to a region where a first plate overlays a second plate.

In an embodiment, full curing of the epoxy resin mixture can be performed by placing the printhead subassembly into a jetstack press as part of a jetstack assembly process. The use of a jetstack press during printhead assembly is well known in the art. With this particular process, the printhead subassembly may be subjected to a press pressure of between about 1.0 psi and about 1000 psi, or between about 10 psi and about 500 psi, or between about 50 psi and about 200 psi. During the application of pressure, the printhead subassembly may be subjected to a temperature sufficient to fully cure the epoxy resin mixture to form a cured adhesive composition/cured thin film adhesive, for example at a temperature of between about 100° C. and about 300° C., or between about 150° C. and about 200° C., or between about 180° C. and about 190° C. The pressure and temperature may be applied to the printhead subassembly for a duration of between about 20 minutes and about 200 minutes, or between about 60 minutes and about 100 minutes.

In certain embodiments, the epoxy resin mixture can be dried at a temperature between about 25° C. and about 30° C.; between about 20° C. and about 40° C.; or between about 15° C. and about 50° C. In embodiments, the curing of the epoxy resin mixture (e.g., the first and second adhesive layers) can be carried out at a temperature of between about 150° C. and about 190° C.; between about 120° C. and about 200° C.; In some embodiments, the epoxy resin mixture can be applied to the metal layer or the polymer film by draw bar coating. The epoxy resin mixture can be in liquid form in some embodiments.

Epoxy resin mixtures of embodiments when properly processed/cured can enable fabrication of high performance, low cost high density inkjet printheads and can meet the demands of UV inks and ink gels, which can be caustic.

The following Examples further define and describe embodiments herein. Unless otherwise indicated, all parts and percentages are by weight.

EXAMPLES

Example 1

Production of Epoxy Adhesive

An adhesive composition was prepared and was composed of EPON™ SU-2.5 epoxy resin (epoxy bisphenol A novolac resin) and Epikure 3300 (isophorone diamine) as a curing agent. The mass ratio of the EPON™ SU-2.5 epoxy resin to the Epikure 3300 curing agent was 100 g:22.3 g. Both EPON™ SU-2.5 and EPIKURE 3300 were purchased from Momentive Specialty Chemicals Inc. The chemical structures of EPON™ SU-2.5 and EPIKURE 3300 used in the adhesive composition are as follows:

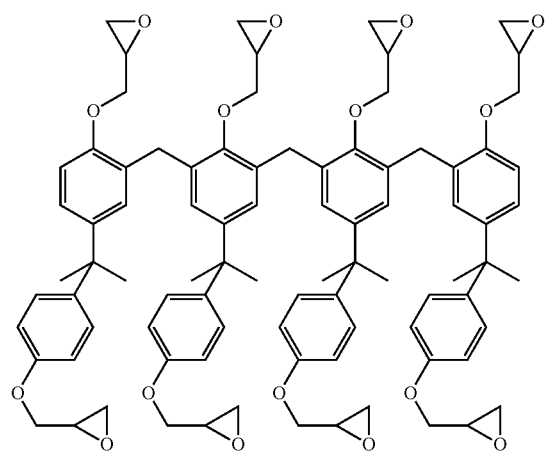

Novolac Resin

+

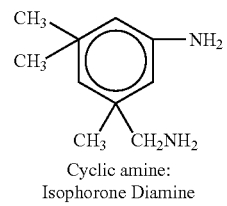

Cyclic amine:
Isophorone Diamine

Example 2

Curing of Epoxy Adhesive

Figure 3:
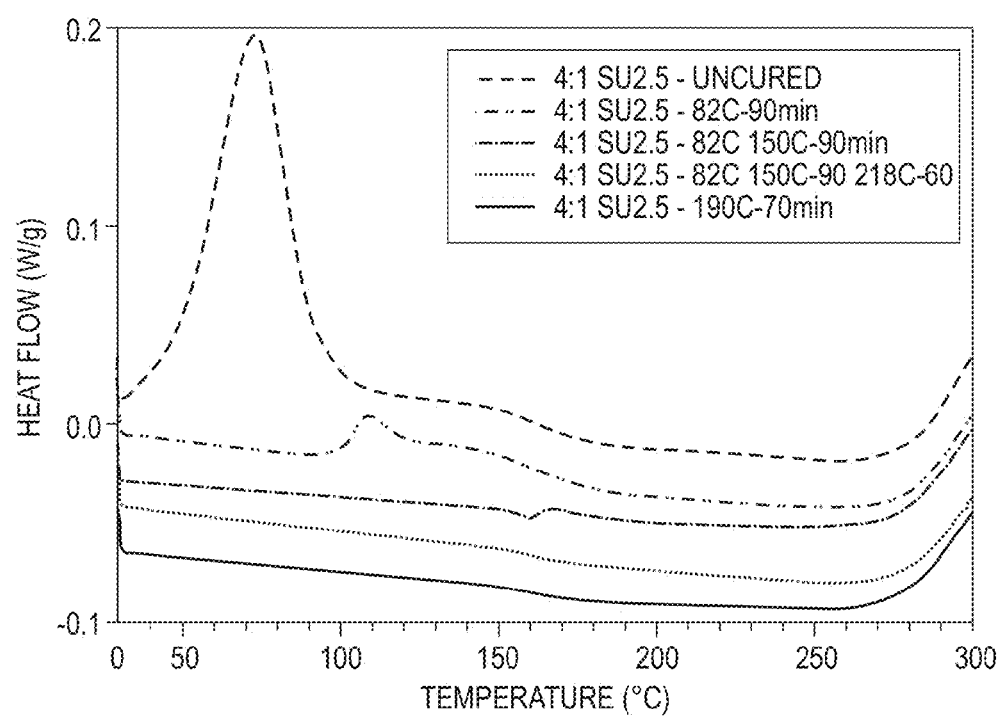
FIG. 3 is a differential scanning calorimetry (DSC) graph of heat flow (W/g) versus temperature (° C.) for adhesives of embodiments under the following curing conditions: uncured; cured at 82° C. for 90 minutes; cured at 82° C. for 90 minutes and then cured at 150° C. for 90 minutes; cured at 82° C. for 90 minutes, then cured at 150° C. for 90 minutes, and also cured at 218° C. for 60 minutes; or cured at 190° C. for 70 minutes. Nitrogen, Flow Rate=50 ml/min, sample is ~10 mg.
Figure 4A:
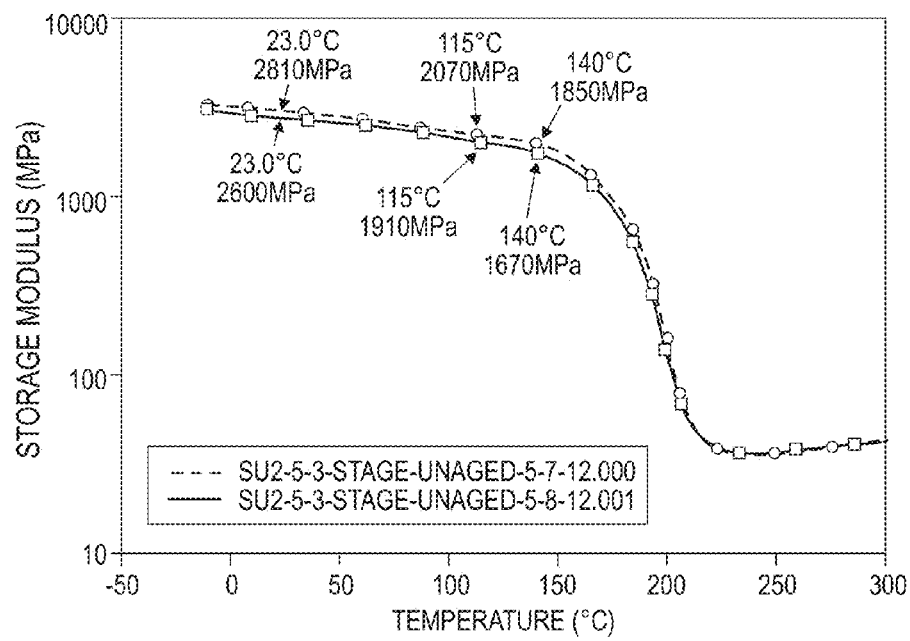
FIG. 4A is a graph of storage modulus (MPa) versus temperature (° C.) for adhesives of embodiments cured at 82° C. for 90 minutes, then cured at 150° C. for 90 minutes, and also cured at 218° C. for 60 minutes.
Figure 4B:
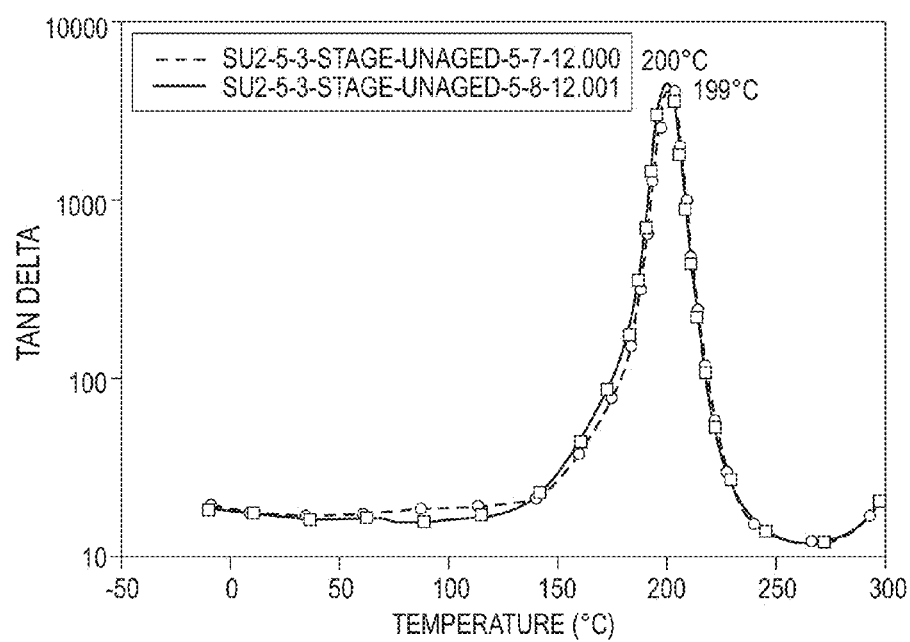
FIG. 4B is a graph of tan($\delta$) (Tan Delta) versus temperature (° C.) for adhesives of embodiments cured at 82° C. for 90 minutes, then cured at 150° C. for 90 minutes, and also cured at 218° C. for 60 minutes.

The adhesive composition of Example 1 was cured at 82° C. for 90 minutes+150° C. for 90 minutes+218° C. for 90 minutes. Differential scanning calorimetry (DSC) was performed to confirm that the adhesive was fully cured. See FIG. 3. Dynamic mechanical analysis (DMA) was conducted to evaluate the physical properties of the final cured epoxy and the data from this analysis is shown in FIG. 4A and FIG. 4B. The $T_g$ (glass transition temperature) of the cured epoxy was found to be 200° C., which was well above the operating temperature (115° C.) of inkjet printheads tested.

Example 3

UV Ink Compatibility Testing

Figure 5:
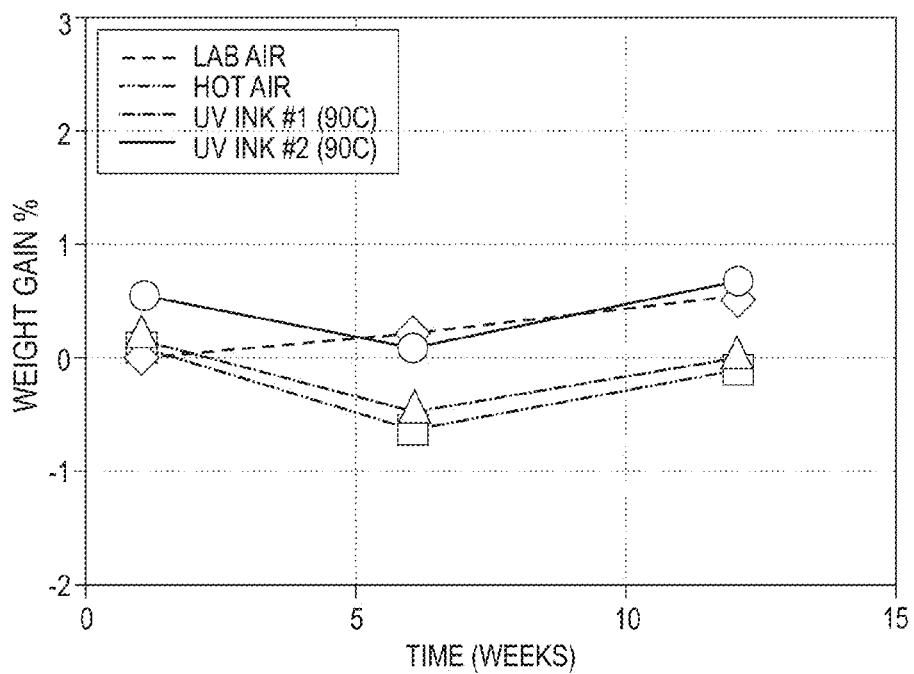
FIG. 5 is a graph of the percent weight change in a cured adhesive of embodiments soaked in either UV ink gel #1 or UV ink gel #2 (Xerox UV gel inks) versus time (weeks) at 90° C., and percent weight change in a cured adhesive of embodiments at room temperature (25° C.) or in hot air at 90° C. versus time (weeks).
Figure 6:
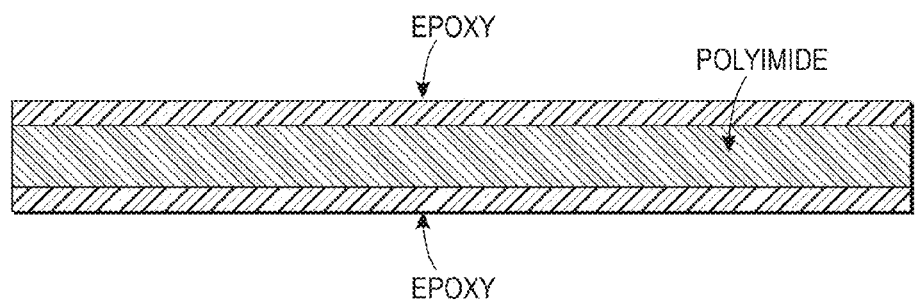
FIG. 6 is a cross section of an adhesive coated film of embodiments.

The adhesive composition of Example 1 was cured at 82° C. for 90 minutes+150° C. for 90 minutes. Coupons of the cured adhesive composition were soaked in Xerox UV gel ink at 90° C. The ink soaking data are shown in FIG. 5. The cured EPON™ SU-2.5/Epikure 3300 adhesive had less than 1% weight gain in Xerox UV gel ink at up to 12 weeks. Multiple soaking coupons of the cured adhesive were soaked into UV gel ink environments (UV ink #1 and UV ink #2, duplicates of same ink) and the results were consistent regardless of the UV gel ink used. The cured epoxy adhesive composition showed excellent compatibility with the UV gel inks tested. (Thickness of the adhesive coupon 8 mil and dimensions of 1 in.×1.5 in.)

The adhesive R/flex® 1500 (a modified acrylic adhesive available from Rogers Corporation) is used in some commercially available printheads that are used with UV inks. Testing showed that UV inks interacted with the R/flex® 1500 adhesive over time and caused swelling of the adhesive, which reduced both the inlet diameter and flow in printheads containing the R/flex® 1500 adhesive. Further, the increased thickness of the R/flex® 1500 adhesive in the stack at the material interfaces (due to extended exposure to and interaction with the UV inks) affected jetting performance. FIG. 2 shows the ink compatibility test for R/flex® 1500 adhesive films. The R/flex® 1500 adhesive film showed 160% weight gain in UV inks in 6 weeks.

Other commercially available adhesives products were evaluated for compatibility with UV inks. See Table 1 below. The cured adhesives were soaked in Xerox UV gel inks. The adhesives were incompatible with the UV gel inks in terms of weight gain or dissolution upon exposure to the UV gel ink.

TABLE 1

| Adhesive Type | Commercial Product | Percent Weight Gain (Test Duration) |
|---|---|---|
| Poly amide-imide | KS 6600 (Hitachi) | 28% (14 weeks) |
| Nitrile phenolic based | TDS 668 (3M) | Dissolved |
| Epoxy-acrylic based | UV 1051 (3M) | 68% (1 week) |
| Modified acrylic | Pyralux FR0100 (DuPont) | 68% (2 weeks) |

Example 4

Preparation of Thin Film Adhesive

An uncured mixture of EPON™ SU-2.5 epoxy resin and Epikure 3300 (isophorone diamine) curing agent as in Example 1 was dissolved in methylene chloride to form a dilute solution capable of being coated onto a surface. The solution was coated onto the surface of a thin uniform polyimide film (thickness 1 mil) using a draw bar. The surface of the polyimide film surface was oxygen plasma treated before coating. The thickness of the epoxy adhesive was controlled via the mixing ratio of the amount of the uncured epoxy adhesive mixture to the amount of the methylene chloride solvent. After coating on the polyimide surface, the epoxy adhesive was allowed to air dry, permitting the solvent (e.g., methylene chloride) to evaporate, and leaving an epoxy adhesive layer on the surface of the polyimide film. For preparation of polyimide films with double-sided epoxy adhesive layers, the solution was subsequently coated on the other side of the polyimide film already having the epoxy adhesive on one side. The newly applied epoxy adhesive solution was then also air dried to evaporate the solvent to provide an epoxy adhesive layer on the second side of the polyimide film.

Example 5

Squeeze-Out and Bonding Strength Testing

Single side epoxy coated polyimide films were prepared as in Example 4 with different epoxy adhesive thicknesses (3 microns, 6 microns and 9 microns). The prepared films were laser cut into the pattern of the compliant wall of a printhead with 500 micron holes. The conditions for bonding the single side epoxy coated polyimide films was 190° C. for 70 minutes at 200 psi. Almost no squeeze-out was observed in all the three films.

Lapshear structures (ASTM D1002) were built for bonding strength evaluation with bonding conditions of 190° C./70 min at 200 psi. Data were collected at both room temperature and elevated temperatures of 115° C. and 140° C. As shown in FIG. 9, the epoxy coated polyimide film yielded at ~1000 psi in terms of shear strength at both room temperature and elevated temperatures. Shear strength of all three thickness coatings met the bonding strength requirement (200 psi). A film with a 6 micron coating thickness gave a relatively more uniform and higher bonding performance.

Example 6

Thermal Oxidative Stability Evaluation

Thin layers a few microns of a mixture of EPON™ SU-2.5 and Epikure 3300 (epoxy adhesive) were built into a piezoelectric printhead stack assembly for thermal oxidative stability evaluation. The printheads were aged at accelerated aging conditions in air at a temperature of 170° C. Stack openings (de-bonding of layers/plates within the stack) were monitored as an indication of failure of adhesive materials.

Another adhesive currently used in some piezoelectric printheads, PD Bond, was tested. Xerox PD Bond was used as the baseline epoxy adhesive and aged at 170° C. in hot air and failure was observed starting at 35 days of aging and about 86% of the piezoelectric printhead stacks had openings by 60 days of aging.

In contrast, piezoelectric printhead stacks prepared using an adhesive made of EPON™ SU-2.5/Epikure 3300 showed no failures until 55 days of aging and had openings in only 14% of piezoelectric printhead stacks by 85 days of aging. It was noted that the temperature of 170° C. resulted in aggressive accelerated aging conditions. (The operating temperature of the printhead is normally about 115° C.) This demonstrated the high thermal oxidative stability of the EPON™ SU-2.5/Epikure 3300 adhesive (a few microns) in the printhead stack assembly. The PZT layer and the bodyplate were bonded using the epoxy adhesive.

To the extent that the terms "containing," "including," "includes," "having," "has," "with," or variants thereof are used in either the detailed description and the claims, such terms are intended to be inclusive in a manner similar to the term "comprising."

Further, in the discussion and claims herein, the term "about" indicates that the values listed may be somewhat altered, as long as the alteration does not result in nonconformance of the process or structure to the illustrated embodiment.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g., −1, −1.2, −1.89, −2, −2.5, −3, −10, −20, and −30, etc.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

What is claimed is:

1. An inkjet printhead comprising:
a first plate;
a second plate;
a cured adhesive composition disposed between and bonding at least one of the first plate and the second plate, wherein the cured adhesive composition has a $T_g$ of greater than about 115° C. and is stable when exposed to acrylate monomer, and wherein the cured adhesive composition is prepared by curing an epoxy resin mixture comprising an epoxy novolac and an amine at a temperature of less than about 200° C.

2. The inkjet printhead of claim 1, wherein the epoxy novolac is an epoxy bisphenol A novolac and the amine is isophorone diamine.

3. The inkjet printhead of claim 1, wherein the epoxy novolac has an epoxide functionality greater than 2 to about 8.

4. The inkjet printhead of claim 1, wherein the amine comprises at least two amino groups.

5. The inkjet printhead of claim 1, wherein the first plate comprises aluminum, polyimide, stainless steel, or gold plated stainless steel and the second plate comprises aluminum, polyimide, stainless steel, or gold plated stainless steel.

6. The inkjet printhead of claim 1, further comprising a UV ink or a UV ink gel.

7. The inkjet printhead of claim 1, wherein there is substantially no squeeze-out of the epoxy resin mixture as it is cured.

8. The inkjet printhead of claim 1, wherein the epoxy resin mixture has a storage modulus of about 100 MPa to about 1500 MPa at about 20° C. and of about 3 MPa to about 700 MPa at about 120° C.

9. An inkjet printhead comprising:
a first plate;
a second plate;
a cured thin film adhesive disposed between and bonding to both of the first plate and the second plate, wherein the cured thin film adhesive comprises a metal layer or a polymer film disposed between a cured first adhesive layer and a cured second adhesive layer,
wherein curing of a first adhesive layer and a second adhesive layer at a temperature of less than about 200° C. while the first adhesive layer, metal layer or polymer film, and second adhesive layer are disposed between the first plate and the second plate results in the bonding of the cured thin film adhesive to the first plate and the second plate and both of the cured first adhesive layer and the cured second adhesive layer have a $T_g$ of greater than about 115° C. and are stable when exposed to acrylate monomer, and
wherein at least one of the first adhesive layer and the second adhesive layer comprises an epoxy novolac and an amine.

10. The inkjet printhead of claim 1, wherein the lapshear strength of the cured thin film adhesive between two stainless steel surfaces, a stainless steel surface to a polyimide surface, or a polyimide surface to a polyimide surface is greater than about 200 psi at temperatures between about 25° C. and about 140° C., wherein the first adhesive layer has a thickness of between about 3 microns and about 9 microns.

11. The inkjet printhead of claim 9, wherein the epoxy novolac is an epoxy bisphenol A novolac and the amine is isophorone diamine.

12. The inkjet printhead of claim 9, wherein the epoxy novolac has an epoxide functionality greater than 2 to about 8.

13. The inkjet printhead of claim 9, wherein the amine comprises at least two amino groups.

14. The inkjet printhead of claim 9, wherein the first plate comprises aluminum, polyimide, stainless steel, or gold plated stainless steel and the second plate comprises aluminum, polyimide, stainless steel, or gold plated stainless steel.

15. The inkjet printhead of claim 9, further comprising a UV ink or a UV ink gel.

16. The inkjet printhead of claim 9, wherein there is substantially no squeeze-out of the first adhesive layer and the second adhesive layer as they are cured.

17. A method of producing an inkjet printhead comprising:
placing a thin film adhesive between a first plate and a second plate;
curing at a temperature of less than about 200° C. the thin film adhesive as it is in contact with both surface of the first plate and the second plate, thereby bonding the cured thin film adhesive to both of the first plate and the second plate,
wherein the cured thin film adhesive comprises a metal layer or a polymer film disposed between a cured first adhesive layer and a cured second adhesive layer,
wherein the cured first adhesive layer and the cured second adhesive layer have a $T_g$ of greater than about 115° C. and are stable when exposed to acrylate monomer, and
wherein at least one of the first adhesive layer and the second adhesive layer comprises an epoxy novolac and an amine.

18. The method of claim 17, further comprising preparing the thin film adhesive by applying an epoxy resin mixture to at least one surface of a polyimide film and drying the epoxy resin mixture without curing the epoxy resin mixture.

19. The method of claim 17, further comprising laser cutting the thin film adhesive to conform to a region where the first plate overlays the second plate.

20. The method of claim 17, wherein the curing is carried out at between about 180° C. and about 190° C. for between about 60 minutes and about 90 minutes.

* * * * *